US009364881B2

(12) United States Patent
Arita

(10) Patent No.: US 9,364,881 B2
(45) Date of Patent: Jun. 14, 2016

(54) WELDED COMPONENT COMPRISING SEAMLESS BENT PIPE AND SEAMLESS STRAIGHT PIPE SECTIONS AND METHODS OF MANUFACTURING THEREOF

(71) Applicant: Tsutomu Arita, Wakayama (JP)

(72) Inventor: Tsutomu Arita, Wakayama (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/021,630

(22) Filed: Sep. 9, 2013

(65) Prior Publication Data

US 2014/0007641 A1 Jan. 9, 2014

Related U.S. Application Data

(60) Division of application No. 12/561,884, filed on Sep. 17, 2009, now Pat. No. 8,549,751, which is a continuation of application No. PCT/JP2008/055478, filed on Mar. 25, 2008.

(30) Foreign Application Priority Data

Mar. 30, 2007 (JP) ................................. 2007-090399

(51) Int. Cl.
| | |
|---|---|
| *B21C 37/06* | (2006.01) |
| *B21D 9/00* | (2006.01) |
| *B21D 9/18* | (2006.01) |
| *B23K 31/02* | (2006.01) |

(52) U.S. Cl.
CPC . *B21C 37/06* (2013.01); *B21D 9/00* (2013.01); *B21D 9/18* (2013.01); *B23K 31/022* (2013.01); *B23K 2201/10* (2013.01); *Y10T 29/49391* (2015.01); *Y10T 29/49428* (2015.01)

(58) Field of Classification Search
CPC ........ B21D 39/08; B21D 39/10; B21D 39/12; B21D 39/14; B21D 39/16; B21D 39/18; B21D 39/20; B21D 39/203; B21D 39/206; B21D 7/16; B21D 7/162; B21D 7/165; B21D 9/00; B21D 9/18; B21D 41/02; B21D 41/021; B21D 41/023; B21D 41/025; B21D 41/026; B21D 41/028; B21D 39/046; B21C 37/065; B21C 37/06; Y10T 29/49428; Y10T 29/49444; Y10T 29/49909; Y10T 29/49911; Y10T 29/49913; Y10T 29/49925; B23K 9/0282; B23K 9/0284; B23K 9/0286; B23K 11/06; B23K 11/0935; B23K 26/282; B23K 31/027; B23K 2201/06; B23K 37/0536
USPC ................. 29/523; 72/307.06, 370.1, 370.11, 72/370.13
See application file for complete search history.

(56) References Cited

U.S. PATENT DOCUMENTS

| | | | |
|---|---|---|---|
| 953,253 A * | 3/1910 | Brinkman ............. B21C 37/283 |
| | | | 29/890.149 |
| 1,903,436 A | 4/1933 | Brown | |
| 1,938,633 A | 12/1933 | Maskrey | |
| 1,956,604 A | 5/1934 | Williams | |
| 1,993,361 A | 3/1935 | Cornell | |
| 2,003,488 A * | 6/1935 | Hook ......................... 285/289.1 |
| 2,057,038 A | 10/1936 | Lindquist et al. | |
| 2,146,901 A | 2/1939 | Lane | |
| 2,183,271 A | 12/1939 | Wendel | |
| 2,336,297 A | 12/1943 | Rooke | |
| 2,963,778 A | 12/1960 | Dolby | |
| 3,270,411 A | 9/1966 | Thomas | |
| 3,303,680 A | 2/1967 | Thielsch | |
| 3,678,727 A | 7/1972 | Jackson | |
| 3,827,126 A | 8/1974 | Shiozawa et al. | |
| 4,056,960 A | 11/1977 | Kawanami | |
| 4,061,005 A * | 12/1977 | Kawanami et al. ............ 72/21.4 |
| 4,062,216 A | 12/1977 | Hanamoto et al. | |
| 4,098,106 A | 7/1978 | Yamaguchi | |
| 4,122,697 A | 10/1978 | Hanyo et al. | |
| 4,161,273 A * | 7/1979 | Jeffers ................... B21D 39/04 |
| | | | 228/154 |
| 4,220,028 A | 9/1980 | Koser et al. | |
| 4,409,810 A | 10/1983 | Yamada | |

(Continued)

FOREIGN PATENT DOCUMENTS

| | | |
|---|---|---|
| DE | 1 017004 | 10/1957 |
| EP | 1 167 852 A2 | 1/2002 |

(Continued)

OTHER PUBLICATIONS

International Search Report for Application No. PCT/JP2008/055478, dated Jun. 17, 2008.

(Continued)

*Primary Examiner* — Jason L Vaughan
(74) *Attorney, Agent, or Firm* — Marshall, Gerstein & Borun LLP

(57) ABSTRACT

Provided are a seamless bent pipe constituted by a bent section and straight pipe sections on both ends of the bent section, with the inside diameter at each pipe end portion being larger than the inside diameter of the bent section, and a welded component comprising a seamless bent pipe and a seamless straight pipe at one or each end of the seamless bent pipe, with the end of the seamless straight pipe to be welded to one or each end of the seamless bent pipe having the same inside diameter as the inside diameter of the seamless bent pipe, as well as methods of manufacturing them. As a result, elements suited for use in pipelines can be obtained, without unnecessarily increasing the wall thickness of the seamless bent pipe and without internal machining of the pipe end portions of the seamless bent pipe after the manufacturing thereof.

7 Claims, 1 Drawing Sheet

(56) References Cited

U.S. PATENT DOCUMENTS

| | | | |
|---|---|---|---|
| 4,416,134 A | 11/1983 | Hayashi | |
| 4,485,766 A | 12/1984 | Worley et al. | |
| 4,487,357 A | 12/1984 | Simon | |
| 4,577,481 A | 3/1986 | Staat | |
| 4,769,897 A * | 9/1988 | Moseman | B21D 39/04 285/382 |
| 5,056,704 A | 10/1991 | Martin et al. | |
| 5,251,714 A | 10/1993 | Murofushi | |
| 5,304,776 A | 4/1994 | Buerkel et al. | |
| 5,339,868 A | 8/1994 | Naoi et al. | |
| 5,464,258 A | 11/1995 | Kornfeldt et al. | |
| 5,483,809 A | 1/1996 | Nishiie et al. | |
| 5,491,996 A | 2/1996 | Baarman et al. | |
| 5,533,370 A | 7/1996 | Kuroda et al. | |
| 5,582,052 A | 12/1996 | Rigsby | |
| 5,589,131 A | 12/1996 | Steketee, Jr. | |
| 5,615,481 A | 4/1997 | Viegener et al. | |
| 5,625,948 A | 5/1997 | Kuroda et al. | |
| 5,937,686 A | 8/1999 | Arai | |
| 6,298,706 B1 | 10/2001 | Dunn | |
| 6,530,256 B1 | 3/2003 | Irie et al. | |
| 6,588,459 B2 | 7/2003 | O'Connell | |
| 6,735,998 B2 | 5/2004 | Mitchell | |
| 6,810,573 B2 | 11/2004 | Morinaga et al. | |
| 6,817,382 B2 | 11/2004 | Tanaka et al. | |
| 6,843,096 B2 | 1/2005 | Viegener et al. | |
| 7,013,697 B2 | 3/2006 | Barber | |
| 7,114,362 B2 | 10/2006 | Mitchell et al. | |
| 7,127,928 B2 | 10/2006 | Nakazato | |
| 7,165,326 B2 | 1/2007 | Kurihara et al. | |
| 7,171,835 B2 | 2/2007 | Nakazato | |
| 7,254,980 B2 | 8/2007 | Cramer | |
| 7,415,765 B2 | 8/2008 | Ozawa | |
| 7,553,148 B2 | 6/2009 | Takamatsu et al. | |
| 7,886,420 B2 | 2/2011 | Naganawa et al. | |
| 2004/0065134 A1 | 4/2004 | Mitchell | |
| 2005/0210950 A1 | 9/2005 | Mitchell et al. | |
| 2008/0053183 A1* | 3/2008 | Dickson et al. | 72/370.13 |

FOREIGN PATENT DOCUMENTS

| | | |
|---|---|---|
| JP | 56-011111 | 2/1981 |
| JP | 58-157529 | 9/1983 |
| JP | 59-121280 A | 7/1984 |
| JP | 02-253088 | 10/1990 |
| JP | 05-329535 | 12/1993 |
| JP | 06-047450 | 2/1994 |
| JP | 07-227629 | 8/1995 |
| JP | 08117855 A * | 5/1996 |
| JP | 09-327732 | 12/1997 |
| JP | 10281355 A | 10/1998 |
| JP | 2004-223530 | 8/2004 |
| JP | 2006326667 A | 12/2006 |
| SU | 472805 A1 | 6/1975 |
| WO | WO-2006/033376 A1 | 3/2006 |

OTHER PUBLICATIONS

International Preliminary Report on Patentability in the International Application No. PCT/JP2008/055478, dated Oct. 13, 2009.

European Search Report for European Patent Application 08 72 2744; Dated Apr. 29, 2010.

Canadian office action for corresponding Application No. 2,678,652 filed Nov. 24, 2011.

Written Opinion International Application No. PCT/JP2008/055478, dated Jun. 17, 2008.

H.H. Oude-Hengel, "Rohrleitugen in Kraftwerken" Verlag TUV Rheinland GmbH, Koin (1978).

* cited by examiner # WELDED COMPONENT COMPRISING SEAMLESS BENT PIPE AND SEAMLESS STRAIGHT PIPE SECTIONS AND METHODS OF MANUFACTURING THEREOF

CROSS-REFERENCE TO RELATED APPLICATIONS

This is a divisional application which claims priority benefit of U.S. patent application Ser. No. 12/561,884 filed Sep. 17, 2009 which is a continuation of PCT/JP2008/055478 filed Mar. 25, 2008 which is based on JP 2007-090399 filed Mar. 20, 2007 the disclosure of which is incorporated herein by reference.

TECHNICAL FIELD

The present invention relates to a seamless bent pipe being an element of pipelines, to a welded component comprising a seamless bent pipe and a seamless straight pipe(s) wherein the seamless pipe is welded to one or each end of the seamless bent pipe, and to methods for manufacturing them.

BACKGROUND ART

In laying line pipes (straight pipes, bent pipes and the like for use in a pipeline is collectively referred to as "line pipe(s)") for transporting fluids such as petroleum or natural gas, not only straight pipes but also bent pipes are used. Generally, the bent pipes are joined to the straight pipes by circumferential welding at exact sites of laying line pipes.

It is preferable that the straight pipe and the bent pipe to be joined together are identical in inside diameter and the inside surface around the circumferentially welded area between the straight pipe and the bent pipe is flush and has no step (difference in height level) so that fluids such as petroleum or natural gas may flow smoothly through the inside of the pipelines. Therefore, it is preferable that the straight pipe and the bent pipe are identical in inside diameter as much as possible and, for that purpose, it is necessary to produce both straight pipes and bent pipes with high dimensional accuracy.

Bent pipes are generally manufactured by hot or cold bending of straight pipes. However, on the occasion of bending, the inner-radius side of a bent section becomes thicker in wall thickness and an outer-radius side of the bent section becomes thinner in wall thickness and, therefore, it is not easy to make a pipe end inside diameter of the bent pipe identical to a pipe end inside diameter of the straight pipe.

Furthermore, seamless pipes for line pipes are produced while primarily controlling an outside diameter and a wall thickness thereof, so that it is difficult to produce pipes, even when they are straight, that have no variations in inside diameter thereof. Therefore, it is much more difficult to produce a bent pipe with high dimensional accuracy by bending such a seamless pipe which is straight (hereinafter referred to as "seamless straight pipe") (such a bent pipe is hereinafter referred to as "seamless bent pipe").

Japanese Patent Application Publication No. 2004-223530 proposes a method for inhibiting bellows defective or flattening defective from appearing on the occasion of hot or cold bending of a metallic straight pipe. However, this method is insufficient for controlling inside and outside diameters of a bent pipe to attain the targeted dimensions.

FIG. 1 shows a configuration of a hot bending apparatus referred to as the prior art in Japanese Patent Application Publication No. 2004-223530 and an example of a bent pipe manufactured by bending. FIG. 1A shows a transitional state of bending by the bending apparatus, FIG. 1B shows a plan view of the bent pipe manufactured, and FIG. 1C shows a sectional view of the bent pipe as seen in the direction of arrows II-II in FIG. 1B.

As shown in FIG. 1A, a straight pipe 1 to be bent is passed through an induction heating coil 2, one end of the straight pipe 1 is securely held by a front clamp 4 mounted on a bending arm 3 that swings around a fulcrum O as the center of swing and the other end thereof is tightly held by a rear clamp 5, and an intermediate portion is pinched by guide rollers 6. A short pipe segment, in a pipe axis direction, of the straight pipe 1 is induction-heated to a temperature allowing ready plastic deformation by means of the induction heating coil 2 and, at the same time, the rear clamp 5 is pushed forward in a pipe axis direction by means of a driving system (not shown) for the straight pipe 1 to continuously advance in a pipe axis direction.

Then, while the short pipe segment, i.e. a heated zone 7 heated by the induction heating coil 2 is continuously forwardly moved along a pipe axis direction, the heated zone 7 is given a bending moment resulting from the swing of the bending arm 3 and is thereby subjected to bending deformation and, immediately thereafter, the bent portion is cooled by spraying with a cooling medium 8, such as cooling water, from the induction heating coil 2, whereby the affected portion after bending is hardened.

In this manner, the bent pipe comprising a bent section 1a and straight pipe sections 1b, 1c on both sides thereof, as shown in FIG. 1B, is manufactured. The thus-manufactured bent pipe shows a thicker wall thickness on an inner-radius side of the bent section 1a and a thinner wall thickness on an outer-radius side of the bent section 1a, as shown in FIG. 1C.

DISCLOSURE OF INVENTION

As described above, bent pipes to be used for line pipes are joined to straight pipes at laying sites by circumferential welding. For preventing weld defects from developing, it is necessary that the pipe end inside diameter of the seamless bent pipe or the seamless bent pipe with seamless straight pipe (s) be identical to a pipe end inside diameter of a straight pipe for line pipes.

However, on the occasion of manufacturing a bent pipe by bending, it is inevitable for an outer-radius side of a bent section to become thinner in wall thickness than an inner-radius side of the bent section. And, for reasons of designing pipelines, the wall thickness of the bent pipe cannot be thinner than the wall thickness of the straight pipe for line-pipes and, therefore, it is necessary to produce a seamless straight pipe to be a bent pipe, which have a thicker wall thickness, for compensating the reduction in wall thickness on the outer-radius side of the bent section upon bending.

Even when the wall thickness of the seamless straight pipe is thus increased for compensating the reduction in wall thickness resulting from the step of bending, pipe end portions of the seamless bent pipe, even after bending the seamless straight pipe, still are the same in wall thickness as the prior-bending seamless straight pipe, because those portions are inhibited from being subjected to bending.

As described above, it is necessary that the pipe end inside diameter of the seamless bent pipe be identical to a pipe end inside diameter of a straight pipe for line pipes and, therefore, following two techniques have so far been employed in welding a seamless bent pipe manufactured by bending to a straight pipe for a line-pipe.

The first technique consists in making an inside diameter of a seamless straight pipe to be used in manufacturing a seamless bent pipe identical to an inside diameter of the straight pipe for a line pipe. The second technique consists in making an outside diameter of a seamless straight pipe to be used in manufacturing a seamless bent pipe identical to an outside diameter of the straight pipe for a line pipe, while internal machining is applied to pipe end portions of seamless bent pipe thus made to make the pipe end inside diameters of the seamless bent pipe identical to the pipe end inside diameter of the straight pipe for a line pipe.

When the first technique, namely the technique consisting in making the inside diameter of the seamless straight pipe identical to the inside diameter of the straight pipe for a line-pipe, is employed, the outside diameter of the seamless straight pipe for manufacturing a seamless bent pipe must be increased by a required increment in wall thickness.

However, seamless straight pipes are produced while controlling the outside diameter and the wall thickness and, therefore, for producing seamless straight pipes differing in outside diameter, tools of appropriate sizes fitted for targeted outside diameters are required. However, the tools for producing the seamless straight pipes are expensive. Therefore, for employing the first technique, it is necessary to prepare tools suited for the respective outside diameters increased by the above-mentioned increment in wall thickness, and this causes marked cost increases in the production of a straight pipe for a line-pipe.

Therefore, seamless straight pipes are produced by involuntarily using existing tools. In case where tools which are close to the desired size but are somewhat larger are used, the outside diameters of seamless straight pipes become larger than those actually required and, therefore, the wall thickness becomes unnecessarily thicker. Therefore, in case where seamless straight pipes are produced by involuntarily using existing tools, the addition of alloying elements in large amounts becomes necessary for exhibiting desired mechanical performance characteristics in the seamless bent pipes manufactured from the seamless straight pipes thus made or, in some instances, the desired mechanical performance characteristics cannot be obtained even when such alloying elements are added.

On the other hand, when the second technique is employed, namely the technique consisting in making an outside diameter of a seamless straight pipe identical to an outside diameter of a straight pipe for a line-pipe, while internal machining of the pipe end portions of a seamless bent pipe after bending thereof is provided to make the pipe end inside diameter of the seamless bent pipe thus made identical to the pipe end inside diameter of the straight pipe for a line-pipe, is employed, the bent section inside diameter of the seamless bent pipe thus manufactured becomes smaller than the inside diameter of the straight pipe for a line pipe. When internal machining is carried out to increase the inside diameter of the bent pipe for a line pipe accordingly, a poor workability and an increase in cost are caused.

Since, as described above, it is difficult to finish the inside diameters of seamless straight pipes to be primary blank materials with high dimensional accuracy in the process of production thereof, the dimensional accuracy of the inside diameter of the bent pipes manufactured from such seamless straight pipe blanks, in the case of manufacturing the seamless bent pipe by bending the seamless straight pipe blanks, becomes further worsened.

Further, while seamless straight pipes are processed in a longer length, seamless bent pipes are manufactured after being cut into short-length pieces from seamless straight pipes and, therefore, they readily undergo fluctuations in inside diameter.

An object of the present invention is to solve such problems and to provide a seamless bent pipe having the same pipe end inside diameter as that of a straight pipe for a line pipe and a welded component comprising such a seamless bent pipe and a seamless straight pipe(s) connected to the pipe end(s) of the seamless bent pipe, without unnecessarily increasing the wall thickness of the seamless bent pipe and without internally machining the pipe end portions of the seamless bent pipe after the manufacturing thereof.

The present inventor made various investigations and experiments to accomplish the above object and to obtain the seamless bent pipe capable of being joined to a straight pipe for a line pipe by circumferential welding and, as a result, obtained the following findings (a) to (e).

(a) For preventing weld defects from developing on the occasion of joining a seamless bent pipe to a straight pipe for a line pipe, it is necessary for the pipe end inside diameter of the seamless bent pipe to be identical to the pipe end inside diameter of the straight pipe for the line pipe. However, that the pipe ends of both pipes are identical in inside diameter on the occasion of welding is sufficient, no matter what an inside diameter of the seamless bent pipe partially is. Although the above-mentioned internal machining is available for the technique consisting in making the both pipe ends identical in inside diameter to each other after manufacturing of the seamless bent pipe, such internal machining is poor in workability and causes marked cost increases.

(b) The inventor came to realize that cold pipe expanding can be utilized as a technique of making the pipe end inside diameter of a seamless bent pipe identical to a pipe end inside diameter of a straight pipe for a line pipe.

The application of this cold pipe expanding to the pipe end portion of the seamless bent pipe will result in low production cost and, in addition, provide high dimensional accuracy. This cold pipe expanding on the pipe end portions of a seamless bent pipe may be carried out either after the manufacturing of the seamless bent pipe by bending the seamless straight pipe or before bending the seamless straight pipe. Furthermore, for improving the dimensional accuracy, cold diameter reduction working may be carried out prior to cold pipe expanding on the pipe end portions of the seamless bent pipe.

(c) The thus-manufactured seamless bent pipe may be joined to a straight pipe for a line pipe by circumferential welding at actual sites of laying line pipes. Alternatively, it is also possible to prepare in advance a welded component comprising a seamless bent pipe and a seamless straight pipe(s) and to join this welded component to other straight pipe for a line pipe by circumferential welding at actual sites of laying the line pipes.

(d) The welded component comprising the seamless bent pipe and the seamless straight pipe(s) may have either structure such that a seamless straight pipe is welded to one pipe end of the seamless bent pipe or structure such that a seamless straight pipe is welded to each pipe end of the seamless bent pipe. In each case, the seamless bent pipe incorporated in the welded component has a pipe end inside diameter larger than the inside diameter in the bent section.

And, this seamless bent pipe can be manufactured by applying either cold pipe expanding or cold diameter reduction working followed by cold pipe expanding on the pipe end portions, as described above. At the same time, the pipe end portion of each seamless straight pipe to be incorporated in the welded component is processed in advance by cold pipe expanding or by cold diameter reduction working followed by cold pipe expanding to make the inside diameter of the seamless straight pipe substantially identical to that of the seamless bent pipe. Thereafter, a welded component comprising the seamless bent pipe and the seamless straight pipe(s) at the pipe end(s) of the seamless bent pipe can be prepared by joining the pipe end portion of the seamless bent pipe and the pipe end portion of seamless straight pipe together by circumferential welding.

(e) It is preferable that the cold pipe expanding on the pipe end portion of the seamless bent pipe and the cold pipe expanding on the pipe end portion of the seamless straight pipe, to be in abutting relation with each other, is carried out by using plugs identical in diameter.

The present invention is accomplished based on such findings described above, and the gist thereof pertains to a seamless bent pipe described in (1), methods of manufacturing seamless bend pipes described in (2)-(4), a welded component described in (5) and methods of manufacturing a welded component described in (6)-(8). These aspects are collectively referred to as the present invention.

(1) A seamless bent pipe comprising a bent section and a straight pipe section on each end of the bent section, wherein both pipe end portions are larger in inside diameter as compared with the inside diameter of the bent section.

(2) A method of manufacturing a seamless bent pipe by bending a seamless straight pipe, wherein the seamless straight pipe, except for each pipe end portion, is subjected to hot bending or cold bending and then straight pipe sections at the pipe end portions that have not been hot or cold bent are subjected to cold pipe expanding.

(3) A method of manufacturing a seamless bent pipe by bending a seamless straight pipe, wherein straight pipe sections at pipe end portions before bending are subjected to cold pipe expanding and then said straight pipe is subjected, except for the pipe end portions that have been subjected to pipe expanding, to hot bending or cold bending.

(4) The method of manufacturing said seamless bent pipe according to (2) or (3), wherein the straight pipe sections at pipe end portions are subjected to cold diameter reduction working prior to cold pipe expanding.

(5) A welded component comprising a seamless bent pipe and a seamless straight pipe at one or each end of said seamless bent pipe, wherein said seamless bent pipe according to (1) or said seamless bent pipe manufactured by any of the methods according to (2)-(4) is used, and the pipe end inside diameter of said seamless straight pipe welded to one or each end of said seamless bent pipe is identical to an inside diameter of said seamless bent pipe.

(6) A method of manufacturing a welded component comprising a seamless bent pipe and a seamless straight pipe at one end or each end of said seamless bent pipe, wherein said seamless bent pipe according to (1) or said seamless bent pipe manufactured by any of the methods according to (2)-(4) is used, and a pipe end portion of said seamless straight pipe which is to be welded to one end or each end of said seamless bent pipe is subjected to cold pipe expanding to make the inside diameter thereof identical to the inside diameter of said seamless bent pipe and then said pipe end of said seamless bent pipe and said pipe end thus processed of said seamless straight pipe are joined together by circumferential welding.

(7) The method of manufacturing the welded component comprising the seamless bent pipe and the seamless straight pipe at one or each end of the seamless bent pipe according to (6), wherein said pipe end portions of said seamless bent pipe and said pipe end portion of said seamless straight pipe are both subjected to cold pipe expanding using plugs identical in diameter.

(8) The method of manufacturing the welded component comprising the seamless bent pipe and the seamless straight pipe at one or each end of said seamless bent pipe according to (6) or (7), wherein said pipe end portion of said seamless straight pipe is subjected to cold diameter reduction working prior to cold pipe expanding.

The methods according to the present invention can provide a seamless bent pipe identical in inside diameter to a straight pipe for a line pipe and a welded component comprising such a seamless bent pipe and a seamless straight pipe at one or each end of the seamless bent pipe, without unnecessarily increasing the wall thickness of the seamless bent pipe and without internally machining pipe end portion(s) of the seamless bent pipe after the manufacturing thereof.

BRIEF DESCRIPTION OF THE DRAWINGS

FIG. 1 shows the configuration of a hot bending apparatus of the prior art and an example of a bent pipe manufactured by bending.

BEST MODES FOR CARRYING OUT THE INVENTION

The following specific examples illustrate the subject matters of the present invention. The present invention is not limited by the following examples.

Figure 1A:
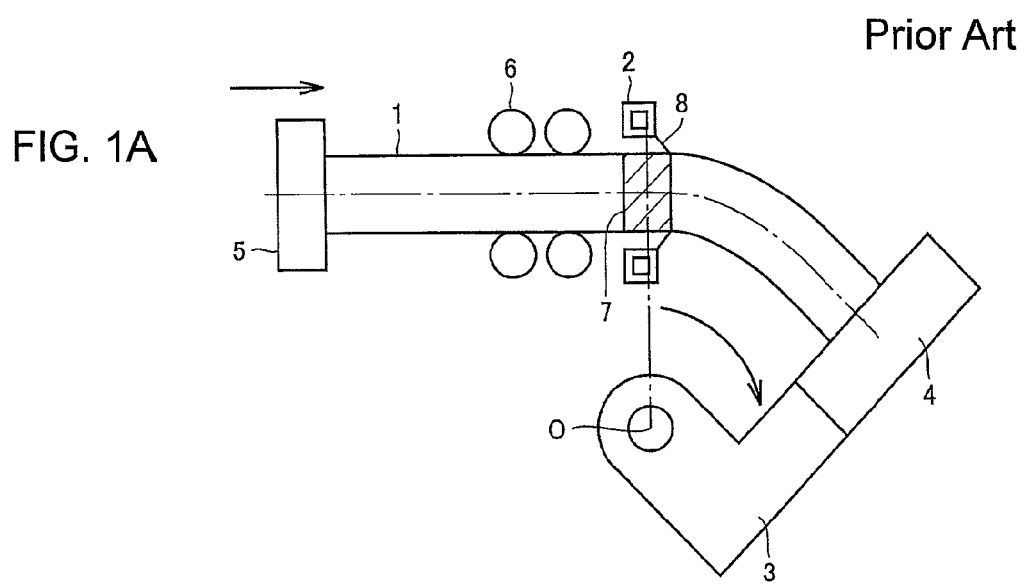
FIG. 1A shows a transitional state of bending by the bending apparatus.
Figure 1B:
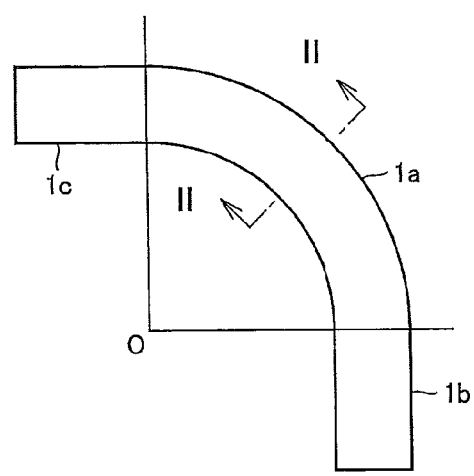
FIG. 1B shows a plan view of the bent pipe manufactured.
Figure 1C:
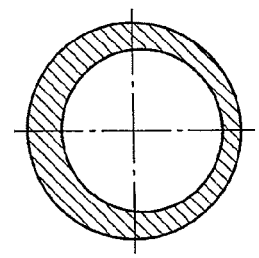
FIG. 1C shows a sectional view of the bent pipe as seen in the direction of arrows II-II in FIG. 1B.

A seamless straight pipe with an outside diameter of 323.9 mm, a wall thickness of 20.0 mm, an inside diameter of 283.9 mm and a length of 500 mm was prepared as a straight pipe for manufacturing a seamless bent pipe. This was subjected to cold bending at a bending angle of 90° using the bending apparatus shown in FIG. 1 to produce a seamless bent pipe. Then, both pipe end portions of the seamless bent pipe obtained was subjected to cold pipe expanding using a plug to expand the inside and outside diameters of each pipe end portion. The outside diameter, inside diameter and wall thickness dimensions of the seamless bent pipe before and after cold pipe expanding of the pipe end portions are shown in Table 1.

TABLE 1

| | Pipe end portion of seamless bent pipe | | |
|---|---|---|---|
| | Outside diameter (mm) ODb | Wall thickness (mm) WTb | Inside diameter (mm) IDb |
| Before pipe expanding | 323.9 | 20.0 | 283.9 |
| After pipe expanding | 329.2 | 20.0 | 289.2 |

Further, seamless straight pipes were cut from a longer straight pipe for a line pipe to prepare seamless straight pipes with an outside diameter of 323.9 mm, a wall thickness of 18.0 mm, an inside diameter of 287.9 mm and a length of 500 mm. Then, one pipe end portion of each seamless straight pipe prepared was subjected to cold pipe expanding by using a plug identical in diameter to the plug used for cold pipe expanding on the seamless bent pipe to increase the inside and outside diameters of the pipe end portion. The outside diameter, inside diameter and wall thickness dimensions of the seamless straight pipes before and after cold pipe expanding of the pipe end portion are shown in Table 2.

TABLE 2

| | Pipe end portion of seamless straight pipe | | |
|---|---|---|---|
| | Outside diameter (mm) ODb | Wall thickness (mm) WTb | Inside diameter (mm) IDb |
| Before pipe expanding | 323.9 | 18.0 | 287.9 |
| After pipe expanding | 325.3 | 18.0 | 289.3 |

As the results shown in Table 1 and Table 2 indicate, the difference in pipe end inside diameter dimension between the seamless bent pipe and seamless straight pipes after cold pipe expanding was as small as 0.1 mm. It was also confirmed that the wall thickness of the seamless bent pipe and that of the seamless straight pipes were hardly varied by cold pipe expanding.

Thereafter, a welded component comprising a seamless bent pipe and seamless straight pipes was prepared by abutting a pipe end of each seamless straight pipe after cold pipe expanding to each end of the seamless bent pipe after cold pipe expanding and by circumferential butt welding thereof.

In this example, the pipe end portions of the seamless bent pipe and the respective pipe end portions of the seamless straight pipes were expanded in diameter by cold pipe expanding alone. It is also possible, however, to subject them once to cold diameter reduction working and then to cold pipe expanding so that the dimensional accuracy may further be improved.

INDUSTRIAL APPLICABILITY

The methods according to the present invention can provide a seamless bent pipe identical in inside diameter to a straight pipe for a line pipe and a welded component comprising such a seamless bent pipe and a seamless straight pipe at one or each end of the seamless bent pipe, without unnecessarily increasing the wall thickness of the seamless bent pipe and without internally machining the pipe end portions of the seamless bent pipe after the manufacturing thereof. The seamless bent pipe and the welded component thus obtained are excellent in construction performance at the site of laying line pipes and therefore can be applied widely.

What is claimed is:

1. A method of manufacturing a seamless bent pipe by bending a seamless straight pipe, the seamless straight pipe having a first pipe end portion and a second pipe end portion opposite the first pipe end portion, each of the first and second pipe end portions having a first inside diameter, the method comprising:
   subjecting the seamless straight pipe, except for the first and second pipe end portions, to hot bending; and then
   subjecting straight pipe sections at the first and second pipe end portions that are not hot bent to cold pipe expanding, thereby increasing an inside diameter of the first and second pipe end portions to a second inside diameter that is larger than the first inside diameter,
   wherein subjecting the seamless straight pipe, except for the first and second pipe end portions, to hot bending comprises:
   locally heating only a portion of the seamless straight pipe between the first and second pipe end portions; and
   bending the locally heated portion of the seamless straight pipe at a pre-determined bending angle.

2. The method of manufacturing the seamless bent pipe according to claim 1, further comprising subjecting the straight pipe sections at the first and second pipe end portions to cold diameter reduction working prior to the cold pipe expanding.

3. The method of manufacturing of the seamless bent pipe according to claim 1, wherein the second inside diameter is substantially identical to an inside diameter of a further seamless straight pipe to be joined to one of the first and second pipe end portions of the seamless bent pipe.

4. The method of manufacturing the seamless bent pipe according to claim 1, further comprising:
   cutting the seamless straight pipe prior to subjecting the seamless straight pipe to hot bending, the cut seamless straight pipe having a wall thickness,
   wherein one of the first and second pipe end portions of the seamless bent pipe is to be circumferentially welded to a further seamless straight pipe having a wall thickness less than the wall thickness of the cut seamless straight pipe.

5. A method of manufacturing a welded component comprising a seamless bent pipe and a seamless straight pipe at an end of the seamless bent pipe, the method comprising:
   manufacturing the seamless bent pipe by (i) using another seamless straight pipe having a first pipe end portion and a second pipe end portion opposite the first pipe end portion, each of the first and second pipe end portions having a first inside diameter, (ii) subjecting the another seamless straight pipe, except for the first and second pipe end portions, to hot bending, and then (iii) subjecting straight pipe sections at the first and second pipe end portions that are not hot bent to cold pipe expanding, thereby increasing an inside diameter of the first and second pipe end portions to a second inside diameter that is larger than the first inside diameter, wherein (ii) comprises locally heating only a portion of the another seamless straight pipe between the first and second pipe end portions, and bending the locally heated portion of the another seamless straight pipe at a pre-detennined bending angle;
   subjecting a pipe end of the seamless straight pipe to be welded to the end of the seamless bent pipe to cold pipe expanding to make an inside diameter of the pipe end of the seamless straight pipe identical to the inside diameter of the seamless bent pipe; and
   joining, by circumferential welding, the pipe end of the seamless straight pipe and the pipe end of the seamless straight pipe.

6. The method of claim 5, wherein the acts of (iii) and subjecting the pipe end of the seamless straight pipe to cold pipe expanding are performed using plugs identical in inside diameter.

7. The method of claim 5, further comprising subjecting the pipe end portion of the seamless straight pipe to cold diameter reduction working prior to the cold pipe expanding.

* * * * *